US 6,593,907 B1

(12) United States Patent
Demers et al.

(10) Patent No.: US 6,593,907 B1
(45) Date of Patent: Jul. 15, 2003

(54) TENDON-DRIVEN SERIAL DISTAL MECHANISM

(75) Inventors: Jean-Guy Demers, Montreal (CA); Johannes M. A. Boelen, Pointe Claire (CA)

(73) Assignee: MPB Technologies Inc., Pointe Claire (CA)

( * ) Notice: Subject to any disclaimer, the term of this patent is extended or adjusted under 35 U.S.C. 154(b) by 0 days.

(21) Appl. No.: 09/487,668

(22) Filed: Jan. 19, 2000

Related U.S. Application Data
(60) Provisional application No. 60/116,397, filed on Jan. 19, 1999.

(51) Int. Cl.$^7$ ................................................. G09G 5/00
(52) U.S. Cl. ....................................... 345/156; 345/161
(58) Field of Search ................................. 345/156, 161

(56) References Cited

U.S. PATENT DOCUMENTS

| | | | |
|---|---|---|---|
| 4,555,960 A | | 12/1985 | King |
| 5,103,668 A | * | 4/1992 | Drutel et al. ............. 73/119 A |
| 5,193,963 A | | 3/1993 | McAffee |
| 5,389,865 A | | 2/1995 | Jacobus |
| 5,576,727 A | | 11/1996 | Rosenberg |
| 5,587,937 A | | 12/1996 | Massie |
| 5,652,603 A | | 7/1997 | Abrams |
| 5,784,542 A | | 7/1998 | Ohm |
| 5,828,197 A | * | 10/1998 | Martin et al. ................ 318/567 |
| 6,197,017 B1 | * | 3/2001 | Brock et al. .................... 606/1 |
| 6,212,783 B1 | * | 4/2001 | Ott et al. ..................... 33/1 PT |

FOREIGN PATENT DOCUMENTS

DE 19543562 A1 * 5/1996 ............ G01B/7/30

OTHER PUBLICATIONS

Burdea, G.C. Force and Touch Feedback for Virtual Reality. John Wiley & Sons. New York, p. 82, 1996.
Cleary K. & Brooks T., "Kinematic Analysis of a Novel 6–DOF Parallel Manipulator", IEEE International Conference on Robotics and Automation, Atlanta, Georgia, pp. 708–713, 1993.

(List continued on next page.)

Primary Examiner—Steven Saras
Assistant Examiner—William Spencer
(74) Attorney, Agent, or Firm—Ogilvy Renault; Guy J. Houle

(57) ABSTRACT

A distal mechanism for providing three degrees of freedom for a rotating handle. Three stages provide a serial mechanical linkage between a handle and a platform, which may itself be moveable in three degrees of freedom. Each stage has an axis of rotation, and the three axes intersect. The first stage is mounted to the platform in such a way as to provide rotation about the first stage axis. The first stage carries the second, allowing the second stage to rotate about its axis. The second stage carries the third stage, allowing the third stage to rotate about its axis. The third stage is fixed to the handle, and the third stage axis passes along the length of the handle. Each stage has a sensor to measure its rotation, and a tendon means of transferring torque from a remote motor to torque about the rotation axis of the respective stage. The sensors have two limited angle ranges of measurement, about 110 degrees wide and on opposite sides of the rotation. The third stage has an auxiliary sensor, mounted in quadrature to the main third stage sensor. It is connected to an idler that carries the third stage tendon. The auxiliary third stage sensor measures angles of rotation that are not measured by the main third stage sensor. The two third stage sensors together provide continuous roll measurement about the third stage axis.

16 Claims, 16 Drawing Sheets

OTHER PUBLICATIONS

Figure 1:
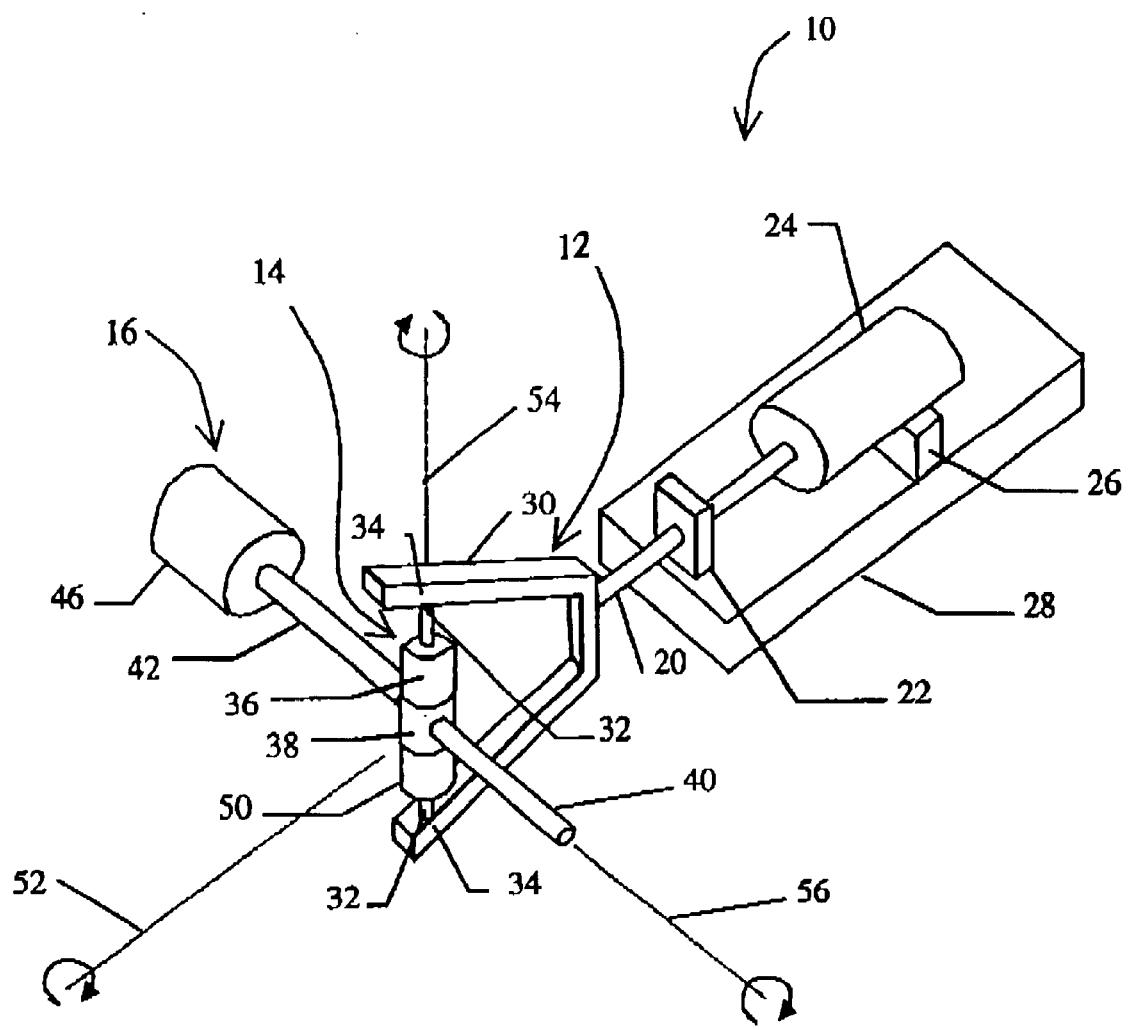

Demers J.–G., Boelen J.M.A. & Sinclair I.P.W. Freedom 6S force feedback hand controller. SPRO '98 1$^{st}$ IFAC Workshop on Space Robotics, Montreal, Canada. Oct. 19–22, 1998.

Hayward V., Gregario P, Astley O., Greenish S., Doyon M., Lessard L., McDougall J., Sinclair I., Boelen S., Chen X. Demers J.–P. and Poulin J. "Freedom 7: A High Fidelity Seven Axis Haptic Device with Application to Surgical Training", ISER '97, Barcelona, Spain, Jun. 15–18, 1997.

Millman P, Stanley M. & Colgate J. [1993], "Design of a High Performance Haptic Interface to Virtual Environments", IEEE International Conference on Robotics and Automation, 1993.

Vertut, J. [1977]. "Control of master slave manipulators and force feedback", Proc. 1977 Joint Auto. Control Conf., 1997.

* cited by examiner

TENDON-DRIVEN SERIAL DISTAL MECHANISM

This application claims the benefit of Ser. No. 60/116,397, filed Jan. 19, 1999.

FIELD OF THE INVENTION

This invention relates to force feedback hand controllers, particularly to six degree of freedom hand controllers with three degree of freedom rotational handles.

BACKGROUND—DISCUSSION OF PRIOR ART

Many attempts have been made to design a realistic force-reflecting master hand controller. These may be organized into serial devices, parallel devices, and hybrid constructions.

The present invention falls under the class of serial device; known examples are listed here:

Serial master devices are produced by Sarcos Research Corporation and CyberNet, among others. The Sarcos device is described by Jacobsen et al (1989) as a ten degree of freedom exoskeleton designed to match the user's arm. It is primarily used to control a slave arm that is kinematically similar to the master arm.

CyberNet's PERforce device is described in Burdea [1996]. It has six linkages connected by rotational joints, terminating in an aircraft style joystick. McAffee et al [1993] describe the CyberNet system as a force reflecting hand controller composed of connected linkages—a group of three for translation, carrying a group of three for rotation. This system makes use of cables and pulleys to transmit forces to the joints, and to carry joint position information to sensors at the base. Sensors arrayed in this manner can lead to instabilities because of delays in sensor signal transmission, owing to stretching of the cables and axial movement on the pulleys.

CyberNet personnel later invented a different system [Jacobus et al, 1995]. This hand controller consists of a three-axis prismatic base translation stage, surmounted by a three-axis rotary stage. Springs are positioned to counteract earth's gravity, allowing the translation stage to float. Low-ratio gears assemblies connect each axis to DC motors mounted in the stage supporting that axis. Back-drivability—the ability to push the handle against the supporting, driving mechanism—is reduced by the presence of gears.

Yokoi et al [1994] also presents a hand controller using three prismatic actuators for translation surmounted by three rotary actuators for orientation.

Massie and Salisbury [1994] describe their PHANToM device, which consists of instrumented gimbals mounted on a balanced four-bar mechanism. The four-bar is motorized, whereas the gimbals are a passive assembly. The PHANToM differs from the other serial devices just described in that only three of the six axes are motorized.

Likewise, Rosenberg et al [1996] outline a three-degree of freedom device that makes use of springs or counterweights to balance against gravity, and a force generator to present forces to the user.

Parallel devices are as follows:

Cleary and Brooks [1993] present a 6-DOF device combining three 2-DOF linkages. Iwata [1990] built a 9-DOF device that provides 6-DOF motion to the hand and 1-DOF motion to 3 sets of fingers. Iwata [1 993] also experimented with a 6-DOF haptic pen positioned by two 3-DOF manipulators. Long and Collins [1992] report a 6-DOF joystick with three parallel pantograph linkages. Millman and Colgate [1991] describe a haptic probe with three active translational degrees of freedom and three passive rotational degrees of freedom. A 4-DOF device using only rotary actuators is presented in Kotoku et al [1992]. Millman et al [1993] describe a 4-DOF (3 translation, 1 rotation) joystick. A 2-DOF five-bar linkage with a horizontal planar workspace is optimized in Hayward et al [1994]. Kelley and Salcudean [1994] present a 2-DOF planar positioning device actuated by linear voice coils. Finally, Vertut [1977] presents an historical survey of earlier hand controllers, articulated arms, and exoskeletons.

A hybrid serial parallel device is described by Stocco and Salcudean (1996). This device, the Twin Elbow, makes use of two five-bar linkages to drive either end of a platform, with a motorized serial linkage to rotate the platform around an axis defined by its endpoints. Hayward et al [1997] describe a parallel device installed in the distal stage of a six degree of freedom hand controller, carried by a balanced serial translation stage.

REFERENCES FOR DESCRIPTION OF PRIOR ART

Burdea, G. C. [1996]. Force and Touch Feedback for Virtual Reality. John Wiley & Sons. New York, p. 82.

Cleary K. & Brooks T. [1993], "Kinematic Analysis of a Novel 6-DOF Parallel Manipulator", IEEE International Conference on Robotics and Automation, Atlanta, Ga., pp. 708–713, 1993.

Hayward, V. [1994], J. Choksi, G. Lanvin, C. Ramstein, "Design and multi-objective optimization of a linkage for a haptic interface", Proc. ARK '94, 4th Int. Workshop on Advances in Robot Kinematics (Ljubliana, Slovenia), June 1994.

Hayward V., Gregario P, Astley O., Greenish S., Doyon M., Lessard L., McDougall J., Sinclair I., Boelen S., Chen X. Demers J.-P. and Poulin J. "Freedom 7: A High Fidelity Seven Axis Haptic Device with Application to Surgical Training", ISER'97, Barcelona, Spain, Jun. 15–18, 1997.

Iwata H. [1990], "Artificial Reality with Force-feedback: Development of Desktop Virtual Space with Compact Master Manipulator", SIGGRAPH, Dallas, Tex., Vol. 24, No. 4, pp. 165–170, Aug. 6–10, 1990.

Iwata H. [1993], "Pen-based Haptic Virtual Environment", IEEE International Symposium Conference on Robotics and Automation, 1993.

Jacobsen S, Iversen E., Davis C., Poter D., and McLain T. [1989]. "Design of a multiple degree of freedom, force-reflective hand master/slave with a high mobility wrist". Proc. ANS/IEEE/SMC 3rd Topical Meeting on Robotics and Remote Systems, ANSI, New York, March 1989.

Jacobus, C. J, Riggs A. J., and Taylor, M. J. Method and system for providing a tactile virtual reality and manipulator defining an interface device therefor, U.S. Pat. No. 5,459,382, issued Oct. 17, 1995.

Kelley A. J. and Salcudean S. E. [1994], "The Development of a Force-Feedback Mouse and its Integration into a Graphical User Interface", Proc. Int. Mech. Eng. Congress & Exposition, Chicago, Ill., DSC-Vol 55-1, pp. 287–294, Nov. 6–11, 1994.

Kotoku T., Komoriya K. and Tanie K. [1992]. "A force display system for virtual environments and its evaluation", IEEE Int. Workshop on Robot and Human Commun., Tokyo, Japan., pp. 246–251, Sep. 1–3, 1992.

Long G. & Collings C. [1992], "A Pantograph Linkage Parallel Platform Master Hand Controller for Force-Reflection", IEEE International Conference on Robotics and Automation, 1992.

Massie T. and Salisbury K. [1994], "The PHANToM Haptic Interface: a Device for Probing Virtual Objects", ASME Winter Annual Meeting, DSC-Vol 55-1, ASME, New York, pp. 295–300.

McAffee D. A., Snow E. R., Townsend W. T. [1993]. "Force reflecting hand controller", U.S. Pat. No. 5,193,963, issued Mar. 16, 1993.

Millman P, Stanley M. & Colgate J. [1993], "Design of a High Performance Haptic Interface to Virtual Environments", IEEE International Conference on Robotics and Automation, 1993.

Millman, P. A. and J. E. Colgate [1991], "Design of a four degree-of-freedom force-reflecting manipulandum with a specified force/torque workspace", Proc. IEEE Int. conf. Robotics & Auto. (Sacramento, Calif., pp. 1488–1493, Apr. 9–11, 1991.

Rosenberg, L. B. and Jackson, B. G. Electromechanical human-computer interface with force feedback, U.S. Pat. No. 5,576,727, issued Nov. 19, 1996.

Stocco, L and Salcudean, S. E. "A Coarse-Fine Approach to Force-Reflecting Hand Controller design". IEEE International Conference on Robotics and Automation, Minneapolis, Minn. Apr. 22, 1996.

Vertut, J. [1977]. "Control of master slave manipulators and force feedback", Proc. 1977 Joint Auto. Control Conf., 1997.

Yokoi H. [1994], Yamashita J., Fukui Y. & Shimoho M., "Development of 3D-Input Device for Virtual Surface Manipulation", IEEE International Workshop on Robot and Human Communication, 1994.

SUMMARY OF THE INVENTION

This invention is the distal mechanism, (handle stage or rotational stage) of a six-degree of freedom force-feedback hand controller. It provides three degrees of freedom of rotational motion for the handle. The handle may consist of any shape suitable for gripping with the hand, such as an elongated cylinder, or a scissors mechanism; different handles may be interchangeable.

The distal mechanism is rigidly attached to a base that may be moveable, that is, it may be a means for providing three degree of freedom translation motion. One embodiment of the moveable base is a balanced, serial mechanism. In the present invention, this moveable base consists of a four-bar coupled to 2-DOF gimbals. Heavy counterweights are used near the axis of movement of the base, in order to minimize inertia. (Inertia of a mass varies as the square of the distance from the axis; by placing heavy mass closer to the axis, inertia is reduced compared to a lighter balancing mass place farther from the axis.) Counterweights are inherently more reliable than springs, which can break and/or vary in spring constant because of metal fatigue.

The distal mechanism consists of a first stage, a second stage and a third stage. The first stage supports the second and third stages, and the second stage supports the third stage. The first stage is mounted on the moveable base, and the third stage carries the handle. The first stage has a first stage axis of rotation, the second stage has a second stage axis of rotation, and the third stage has a third stage axis of rotation. The first, second and third axes of rotation cross one another at an axis crossing point, forming a three degree of freedom spherical mechanism.

The handle has an axis that is coincident with the axis of the third stage. The handle is axially connected to a handle shaft that turns in a handle shaft support bearing assembly. The handle shaft passes through the axis crossing point. The second stage houses the handle shaft support bearing assembly, and also a second stage bearing assembly that permits rotation of the second stage about the second stage axis of rotation. The body of the second stage bearing assembly is fixedly attached to a second stage support assembly that is in turn fixedly attached to a first stage shaft. The first stage shaft is supported by a first stage shaft support bearing assembly that permits rotation about the first stage axis. The body of the first stage support bearing assembly is fixedly attached to the moveable platform.

Each stage is connected fixedly to a drive pulley, with an axis coincident with the axis of rotation of its respective stage. Torque is transmitted by means of tendons from three rotary motors to the drive pulleys on the three stages. The three motors are positioned at the base of the hand controller. The tendons pass from the motor along idlers positioned in the translation stage joints, to the distal mechanism. In the distal mechanism, idlers direct the tendons to the drive pulley on each stage. Typically, the tendon is wrapped twice around each drive pulley, and secured to a tying point on the drive pulley. The two ends of each tendon meet at this point.

The tendon for a given stage is wrapped several times around a capstan on the motor. The middle loop on the capstan is also passed around an idler pulley attached to a spring-loaded assembly with a single degree of freedom, positioned in such a way that the spring, acting on the single degree of freedom, provides tension to the tendon.

Each stage is also connected fixedly to the shaft of a magneto-resistance rotary angle sensor. The axis of the sensors is coincident with the rotary axis of its respective stage. In addition, a fourth sensor is used to detect the rotational angle of the third stage. This fourth sensor is mounted on an idler which redirects the tendon path to the axis of the fourth stage. Having two sensors extends the range of the third stage handle rotation about its axis from the 110-degree limitation of the rotary sensor to a full 360 degrees.

OBJECTS AND ADVANTAGES

The main object of the device is to serve as the rotation (or distal) stage, mounted at the end of a translation stage in a six-degree of freedom force feedback hand controller. The handle roll, pitch and yaw angles are sensed in the mechanism, and transmitted to a computer system, which then returns appropriate torque to be applied to the handle's roll, pitch and yaw. The user, grasping the handle, can control a portion of a computer simulation, and experience forces generated in the computer simulation.

High-resolution magneto-resistance sensors are used for angular measurement. These non-contact sensors have advantages over potentiometers, in terms of smooth response, low friction and low noise levels; compared to optical encoders, they are lighter and less expensive; compared to RVDTs (rotary variable differential transducers) they have simpler control electronics and consequently a lower price.

The device uses polymer tendons to provide driving force, with motors situated on the base. These tendons transmit the drive forces in the most efficient manner, since they are lightweight and minimally extensible. Other flexible tendons may be used. Polymer tendons have less bending resistance than metallic cables, and so offer minimal resistance to motion.

There are no gears. Tendons are used to connect the three axes to the motors, permitting maximum back-drivability. Gears reduce back-drivability by operating primarily in one direction, from the motor toward the load.

Having the sensors incorporated directly into the distal stage allows for an immediate reading on the position of the user's hand, by means of the handle. Sensors located some distance away, along the tendon path, suffer from lag and inaccuracy introduced by slackness in the tendon, caused in turn by movement of the tendon on the idler pulleys or by imperfections in the pulley bearings and supports. The accuracy of the reading makes the control loop more stable, and allows for very robust calibration of the handle rotational position.

The serial nature of the mechanism means a simpler forward kinematics and static force analysis compared to a parallel mechanism. Computationally, it provides a much simpler coupling between the corresponding degrees of freedom.

This device is especially compact, so that weight is reduced while avoiding the use of tiny parts (e.g. jewel bearings), thereby making it mechanically robust. Reduced weight implies less inertia in the movement and an improved response to a given torque, enabling higher virtual stiffness.

The mechanism can be upgraded to include an additional degree of freedom for scissors or gripper operation. There is room in the distal stage for a fourth driver pulley. The scissors mechanism would be attached to this fourth drive pulley, attached to a fourth tendon and driven by a fourth drive motor.

DRAWING FIGURES

Fifteen (15) drawings are attached:

1. Outline view of the Tendon-Driven Serial Distal Stage.

2. Tendon routing path for pitch (first stage rotation).

3. Tendon routing path for yaw (second stage rotation).

4A. Tendon routing path for roll (third stage rotation): Sensors and brackets in place.

4B. Tendon routing path for roll (third stage rotation): Sensors and bracket removed.

5. Tendon routing path for tendon drive motor and tendon-tensioning assembly.

6A. Tendon-Driven Serial Distal Stage, with one embodiment of the Scissors Mechanism.

6B. Closer view of one embodiment of the Scissors Mechanism.

7. Overall view of the principal embodiment of the mechanism.

8. Roll and yaw mechanism, with roll tendon routing, showing enclosed Sensors 2 and 3.

9. Roll and yaw mechanism, with pitch tendon routing.

Figure 9:
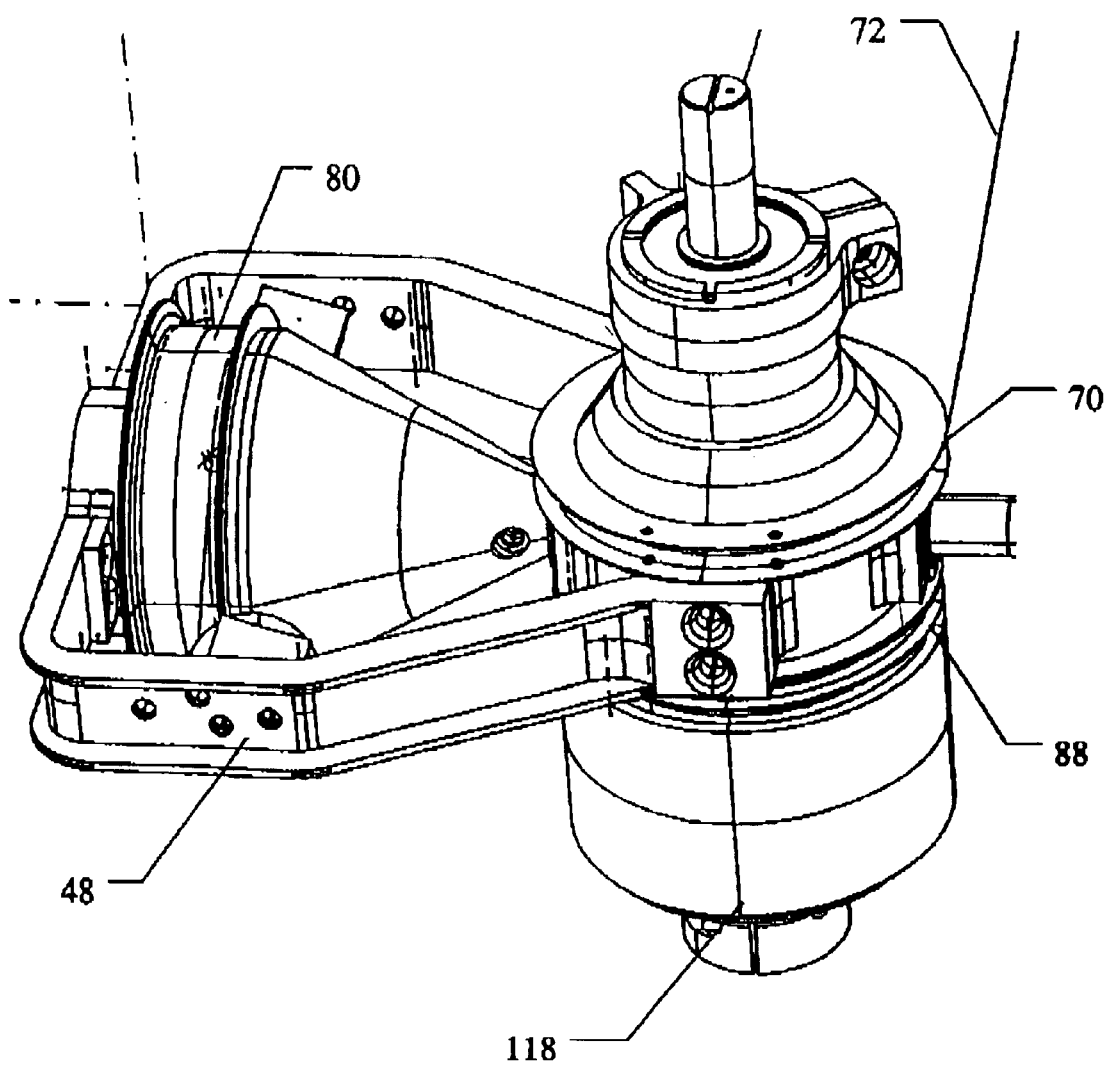
Figure 10:
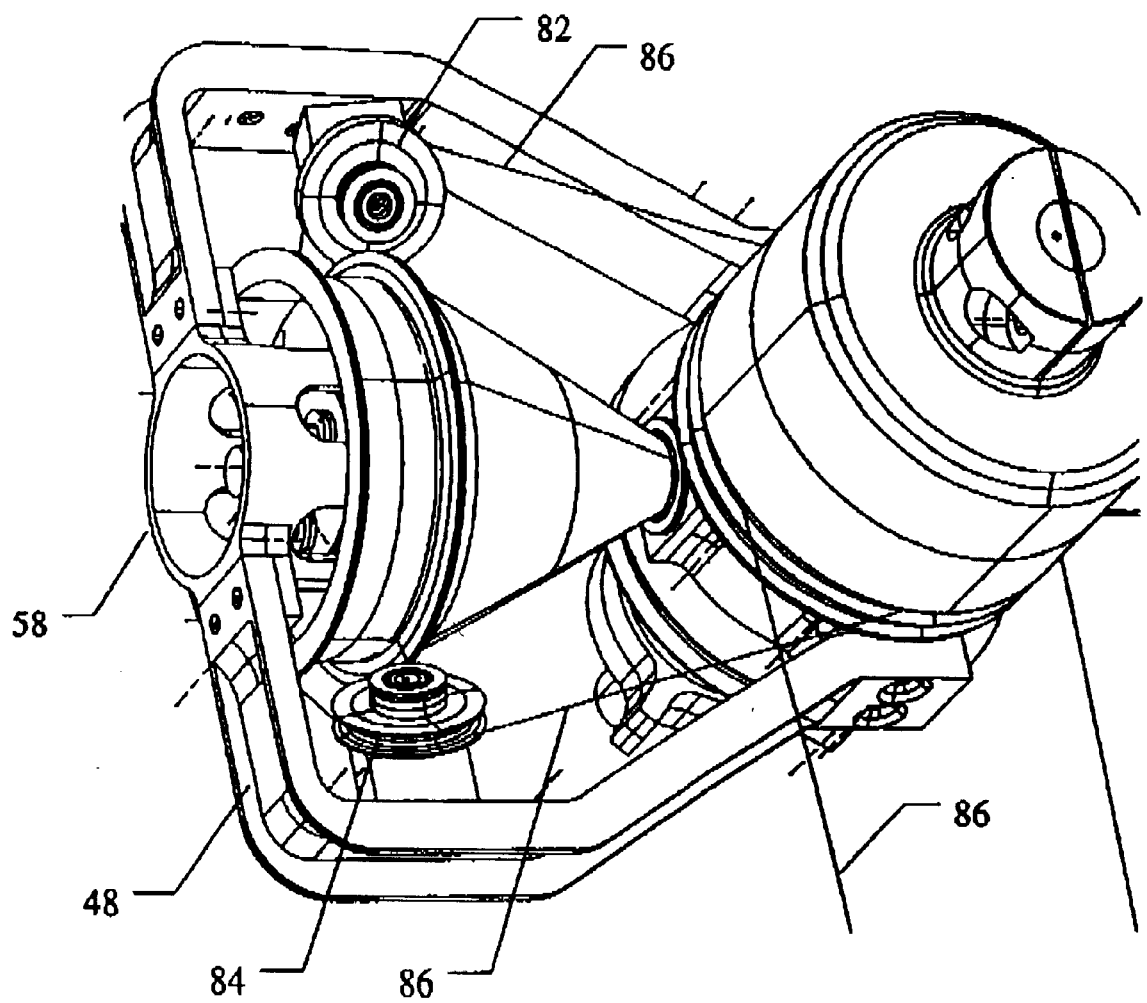

10. Roll mechanism, with roll tendon routing (from the underside of FIG. 9).

11. Distal mechanism, cut away to show sensors and bearings.

12. Closer view of distal mechanism cutaway.

13. Stylized view of distal mechanism.

14. Exploded stylized view of distal mechanism.

REFERENCE NUMERALS IN DRAWINGS

| | |
|---|---|
| 10 | Serial Distal Mechanism |
| 12 | First Stage |
| 14 | Second Stage |
| 16 | Third Stage |
| 18 | Hand of a user |
| 20 | First stage shaft |
| 22 | First stage shaft bearing support |
| 24 | First rotational sensor |
| 26 | First rotational sensor support |
| 28 | Moveable platform |
| 30 | Second stage support |
| 32 | Second stage support shafts |
| 34 | Second stage support shaft bearings |
| 36 | Second rotational sensor |
| 38 | Second stage body |
| 40 | Handle |
| 42 | Third stage shaft |
| 44 | Third stage shaft support |
| 46 | Third rotational sensor |
| 48 | Third rotational sensor support |
| 50 | Fourth rotational sensor |
| 52 | First stage axis (pitch motion) |
| 54 | Second stage axis (yaw axis) |
| 56 | Third stage axis (roll axis) |
| 58 | Third rotational sensor support case |
| 60 | First stage drive pulley |
| 62 | First stage idler pulley left |
| 64 | First stage idler pulley right |
| 66 | First stage tendon |
| 68 | Through holes in first stage drive |
| 70 | Second stage drive pulley |
| 72 | Second stage tendon |
| 74 | Not Used |
| 76 | Not Used |
| 78 | Not Used |
| 80 | Third stage drive pulley |
| 82 | Third stage idler pulley left |
| 84 | Third stage idler pulley right |
| 86 | Third stage tendon |
| 88 | Fourth sensor pulley |
| 90 | Typical distal stage drive motors |
| 92 | Distal stage motor capstan |
| 94 | Typical distal stage tendon |
| 96 | Tendon loops around capstan |
| 98 | Tendon loop around tensioning idler |
| 100 | Tendon-tensioning assembly |
| 102 | Tensioning idler |
| 104 | Tensioning idler support |
| 106 | Tensioning idler support joint |
| 108 | Tensioning spring |
| 110 | Tensioning spring upper support |
| 112 | Tensioning spring lower support |
| 114 | Second-stage drive-pulley extension. |
| 116 | Third-stage drive-pulley extension. |
| 118 | Fourth sensor pulley extension. |
| 120 | Scissors mechanism |
| 122 | Lower scissors handle |
| 124 | Upper scissors handle |
| 126 | Scissors handle link |
| 128 | Scissors handle link joints |
| 130 | Slider/Rotator mechanism |
| 132 | Slider/Rotator scissors handle side |
| 134 | Slider/Rotator drive pulley side |
| 136 | Handle shaft bearing support |
| 138 | Scissors drive pulley link |
| 140 | Scissors drive pulley |
| 142 | Scissors drive pulley link joints |
| 144 | Upper scissors handle joint |
| 146 | Scissors tendon |
| 148 | Scissors rotational sensor |
| 150 | Movement of upper scissors handle |
| 152 | Movement of scissors drive pulley |
| 154 | Not used |
| 156 | Not used |
| 158 | Not used |
| 160 | Fourth sensor pulley lower half |
| 162 | Fourth sensor pulley upper half |
| 164 | |
| 166 | |
| 168 | |
| 170 | |
| 172 | |
| 174 | |
| 176 | |

| 178 |
| 180 |

DESCRIPTION

The device, a Tendon-Driven Serial Distal Stage, is shown in concept in FIG. 1.

This device 10 generally consists of three stages—a first stage 12, a second stage 14 and a third stage 16. The stages are connected serially, so that the first stage 12 is attached to and supports the second stage 14, while the second stage 14 is attached to and supports the third stage 16. A handle 40 is attached to the third stage 16, and can be grasped by the hand 18 of a user of the hand controller. This is shown generally in FIG. 1.

The first stage 12 has a first stage axis 52 about which it rotates; the second stage 14 has a second stage axis 54 about which it rotates; and the third stage 16 has a third stage axis 56 about which it rotates. The first stage rotation is known as pitch, the second stage rotation is known as yaw, and the third stage rotation is known as roll. All three axes pass through the same point. When activated, pitch, yaw and roll describe the motion of the handle, which is then rotating in three degrees of freedom.

The first stage includes a first stage shaft 20, which has a first and a second end. The first stage shaft is supported near its first end by a first stage shaft bearing support 22. The first end is fixedly attached to a second stage support structure 30, which can be a yoke, or a single cantilevered support. The second end is attached axially to the shaft of a first rotational sensor 24, so that when it rotates, the sensor 24 can read the rotation. The sensor incorporates a bearing that permits rotation of the shaft about axis 52. The body of sensor 24 is fixedly attached to a moveable platform 28 by means of a first rotational sensor support 26. The first stage shaft bearing support 22 is also fixed attached to the moveable platform 28. Thus the first stage shaft 20 can rotate about axis 52 while being held at a constant orientation with respect to the moveable base 28.

The second stage 14 includes a body 38 which is attached to one or more support shafts 32 in such a way that the body 38 can rotate about the second stage axis 54. Bearings 34 permit this rotation. A rotational sensor 36 senses the rotation about axis 54. One bearing 34 is integral with sensor 36; the other may be embedded in support 30. (FIG. 11 and FIG. 12, to be described later, show more detail of the main embodiment of the second stage 14. Second stage 14 houses two rotational sensors, 36 and 50, and a support 44 for the third stage.

The third stage 16 includes a third stage shaft 42 having an axis coincident with third stage axis 56. A bearing support 44 enclosed in second stage 14 supports shaft 42, while preventing it from sliding in and out of support 44. (It is constrained by bearings press fitted to it.) Third stage shaft 42 has a first end and a second end. Handle 40 is attached to the first end of shaft 42, while the second end is axially attached to the shaft of rotational sensor 46. The body of sensor 46 is fixedly attached to second stage body 38, so that it measures the rotation of both shaft 42 and handle 40 about axis 56.

Figure 2:
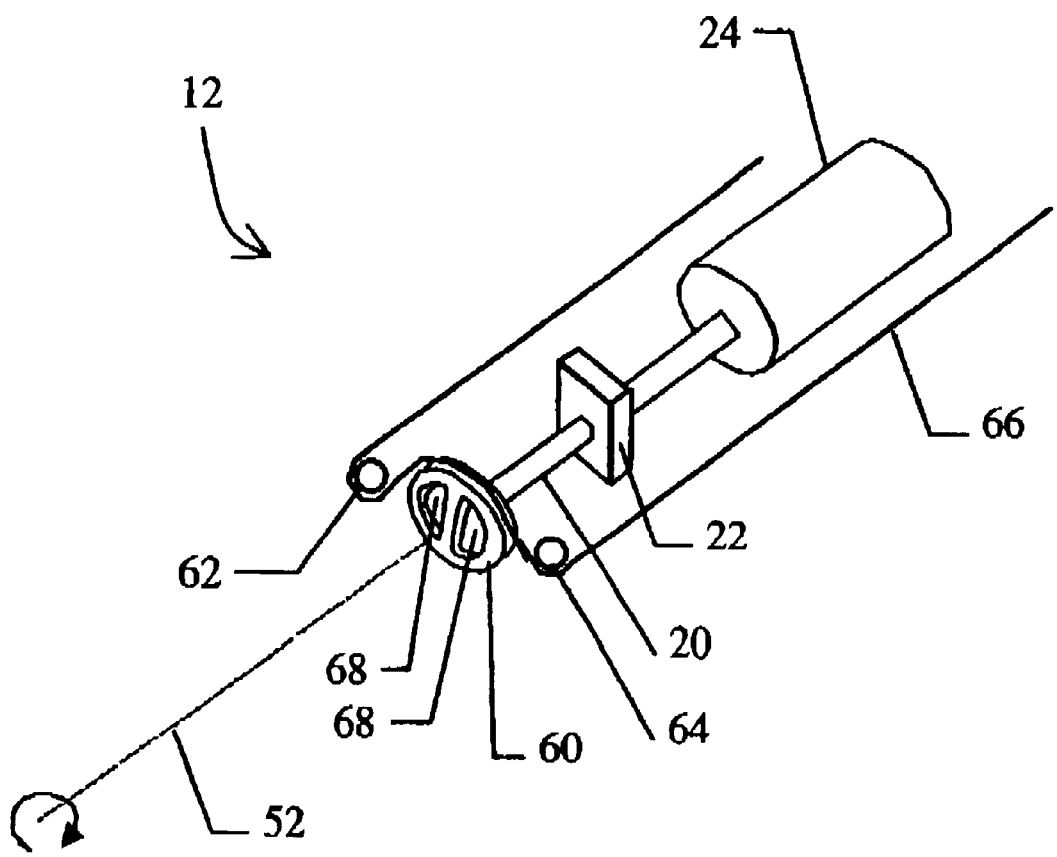
Figure 3:
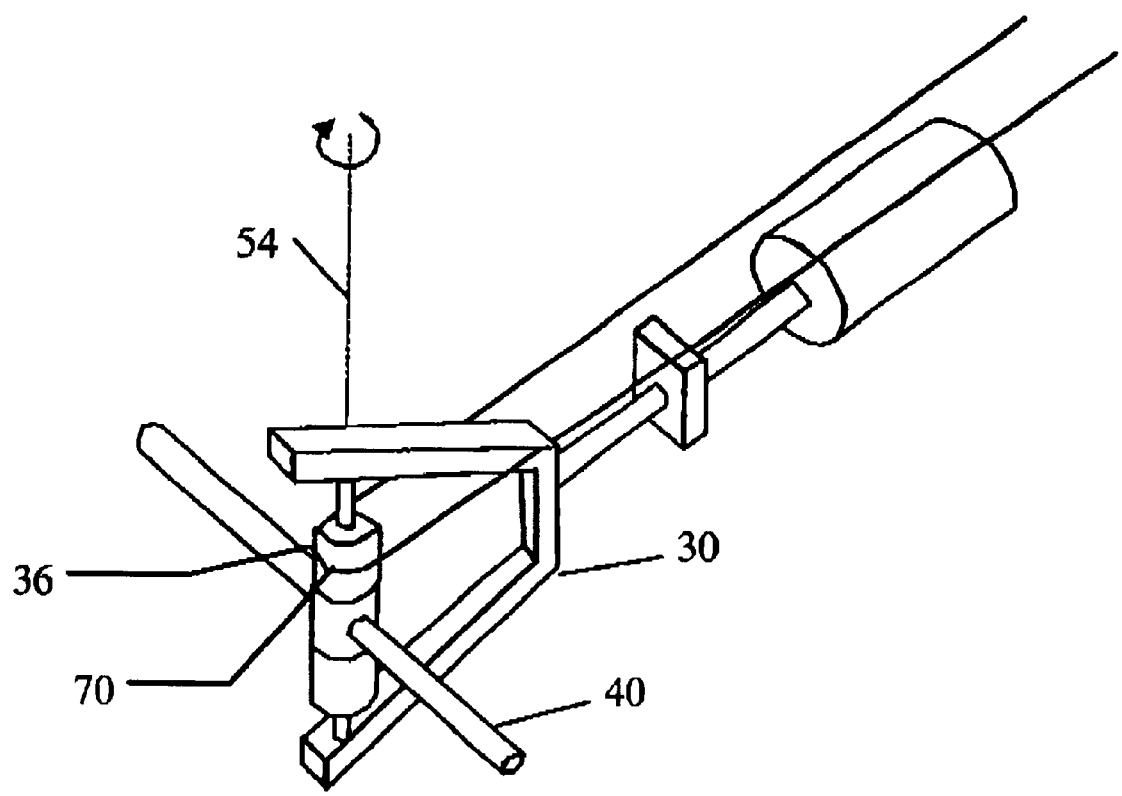
Figure 4A:
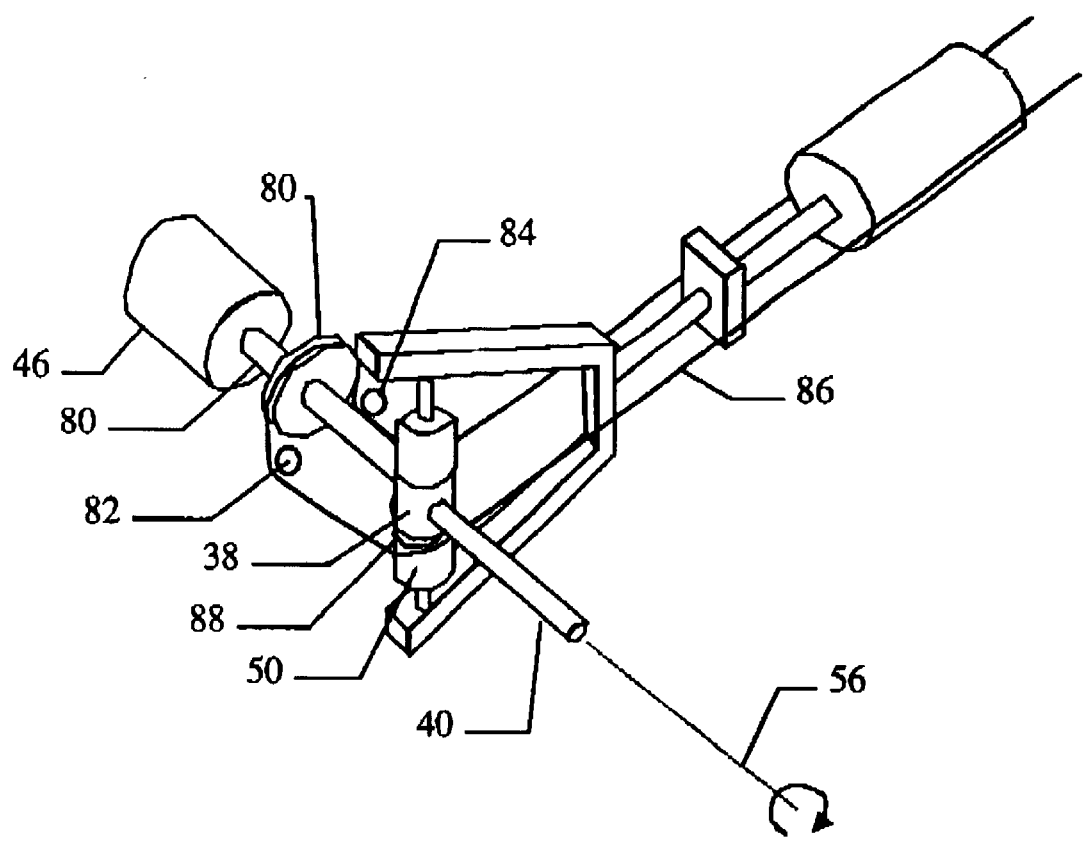

Separate tendons, 66, 72 and 86 drive stages 12, 14 and 16, respectively (FIG. 2, FIG. 3 and FIG. 4A). Each tendon transfers torque efficiently from a remote rotational motor 90 (FIG. 4C).

FIG. 2 shows the tendon routing for first stage 12 rotation, termed pitch, about axis 52. At the first end of first stage shaft 20, a drive pulley 60 is fixedly attached. Tendon 66 is routed roughly parallel to first stage axis 52, and is directed to drive pulley 60 by two idlers, a left idler 62 and a right idler 64. Drive pulley 60 has two large openings 68 that permit the tendons for second stage 14 and third stage 16 to pass through without interference while first stage 12 is rotating about its axis 52.

Drive pulley 60 also has attachment point for the ends of tendon 66, so that it may be tied off on the pulley. Typically, tendon 66 passes twice around pulley 60, to ensure non-slip contact, and to permit rotation unhindered by the tie point of the tendon. This is true for all drive pulleys, 60, 70 and 80.

FIG. 3 shows the tendon routing for second stage 14. A drive pulley 70 is fixedly attached to body 38 of second stage 14. A tendon 72 is routed roughly parallel to first stage axis 52, through the apertures 68 in first stage drive pulley 60, and around pulley 70.

Figure 4B:
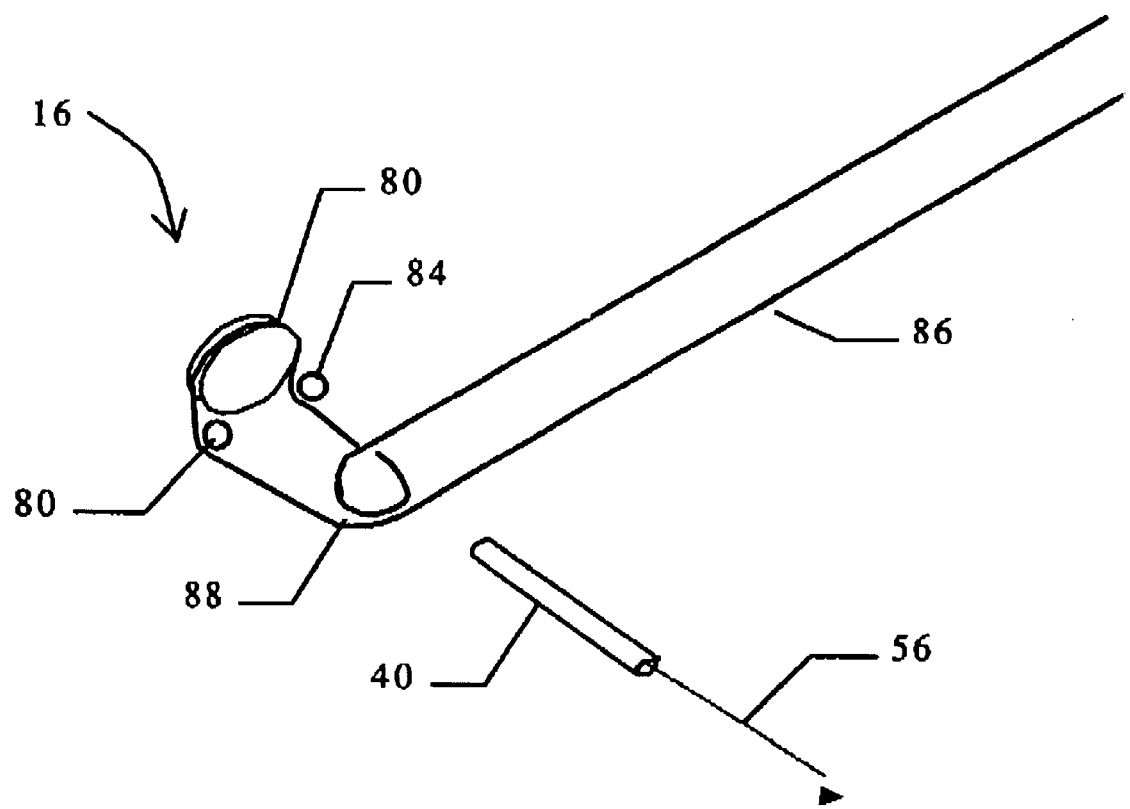

FIG. 4A shows the tendon routing for third stage 16. A drive pulley 80 is fixedly attached to third stage shaft 42, such that the axis of drive pulley 80 is coincident with the axis of shaft 42, and with third stage axis 56. Three idlers are required to route a tendon 86 from its path parallel to first stage axis 52. Tendon 86 has a left and a right part, joined at drive pulley 80 to form a loop. An idler 88 attached to second stage body 38 alters the direction of tendon 86 by approximately 90 degrees in the plane idler 88. The right part of tendon 86 makes a quarter turn around pulley 88, while the left part makes three-quarters of a turn. FIG. 4B, with several parts removed, shows this more clearly. Idler pulleys 82 and 84 are required to reroute tendon 86 from the plane of pulley 88 to the orientation of third stage drive pulley 80. Each idler pulley 82 and 84 changes the tendon direction by about 90 degrees, to align with drive pulley 80, whose axis is coincident with third stage axis 56.

Figure 5:
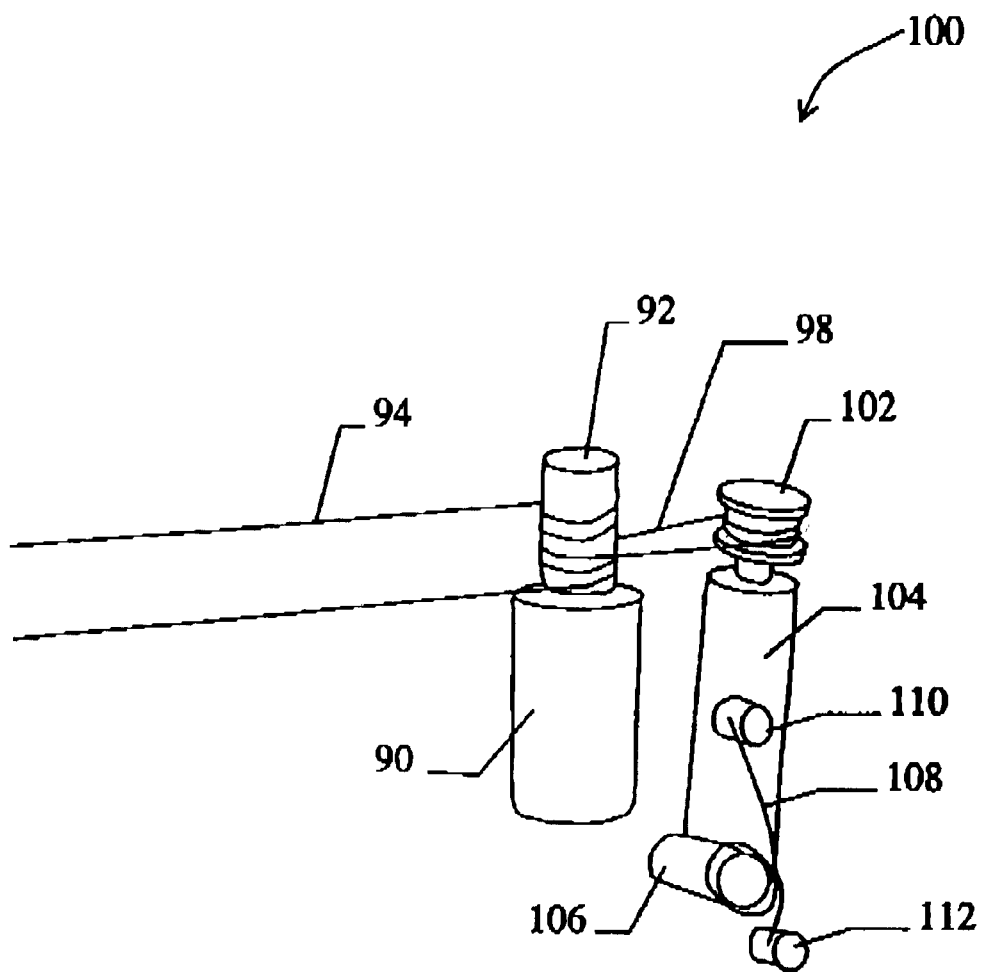

For all tendons, a tendon drive and tensioning apparatus is required. This is shown in FIG. 5. A rotational motor 90 has a capstan 92 attached to its shaft. Typical tendon 94 (which may be Tendon 66, 72 or 86) is wrapped around capstan 92 with several turns 96. The middle turn 98 is pulled out and routed around idler 102, which is part of a tendon-tensioning assembly 100.

Tendon-tensioning assembly 100 consists of a link 104 with a first and a second end. Pulley 102 is mounted on the first end, so it is free to rotate about an axis roughly parallel to the axis of the motor 90 and capstan 92. The second end of link 104 terminates in a hinge joint 106, which permits motion of link 104 in one degree of freedom. A spring 108 is wound around the body of joint 106, and tensioned at the upper and lower spring supports 108 and 110.

A tensioning force of only a few grams is required. Several turns around the capstan provide plenty of driving force, without undue friction because of tendon tension.

FIG. 7 to FIG. 12 show the principal embodiment of the tendon-driven serial distal mechanism. Parts are labeled according to the nomenclature developed for the schematic representations. The pulley extensions are very predominant in the structure. Extension 114 connects second stage drive pulley 70 to the body of sensor 36, mounted inside second stage body 38. Extension 114 also supports third stage shaft support 44. Extension 116 connects third stage drive pulley 80 to third stage shaft 42. Extension 118 connects fourth sensor pulley 88 to the shaft of rotational sensor 50, also mounted inside second stage body 38. The structure on each side of pulley 80 and pulley extension 116 is third rotational sensor support 48.

Figure 8:
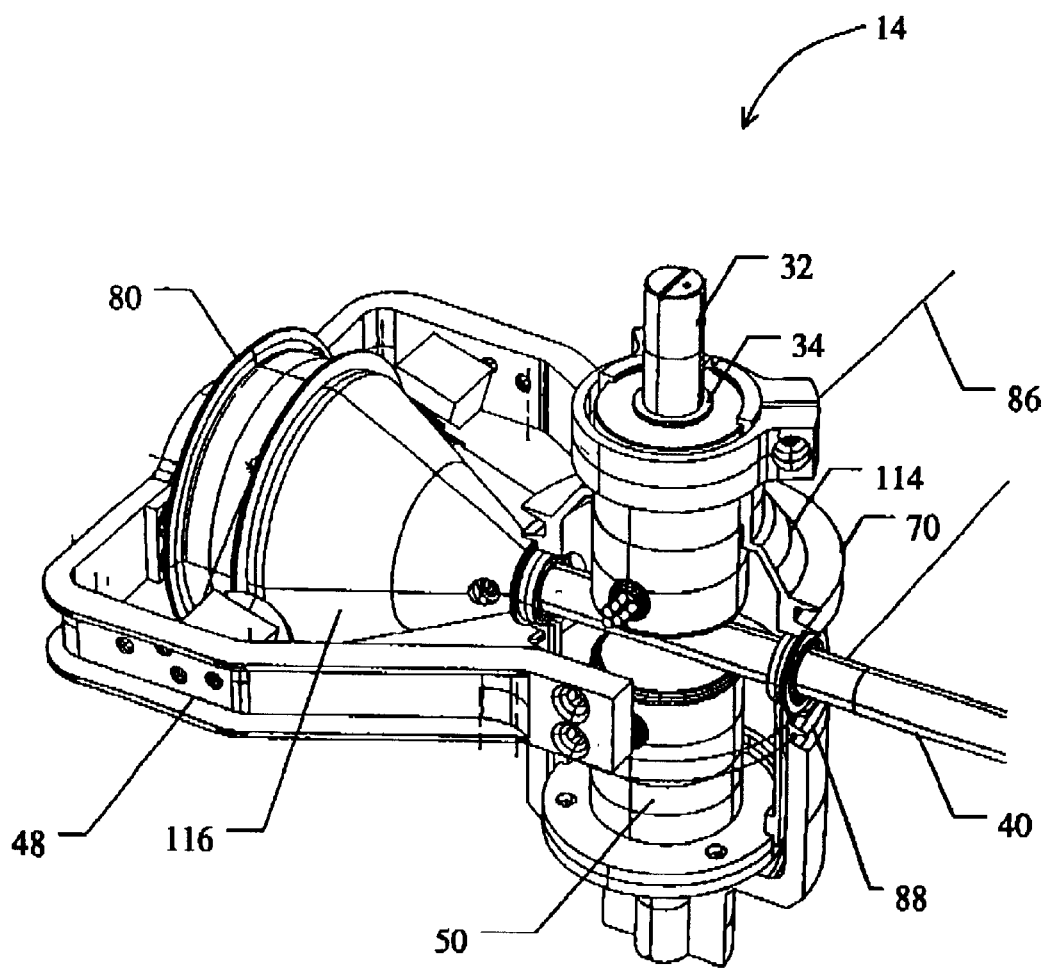
Figure 11:
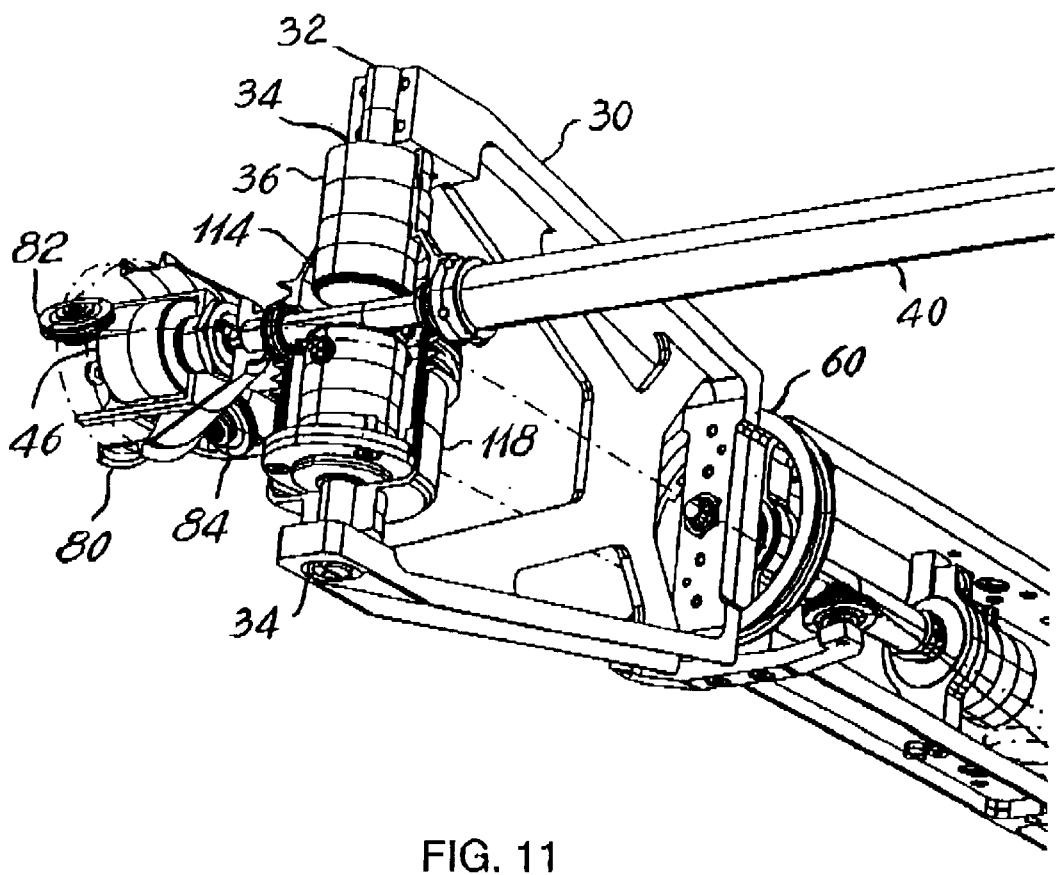
Figure 12:
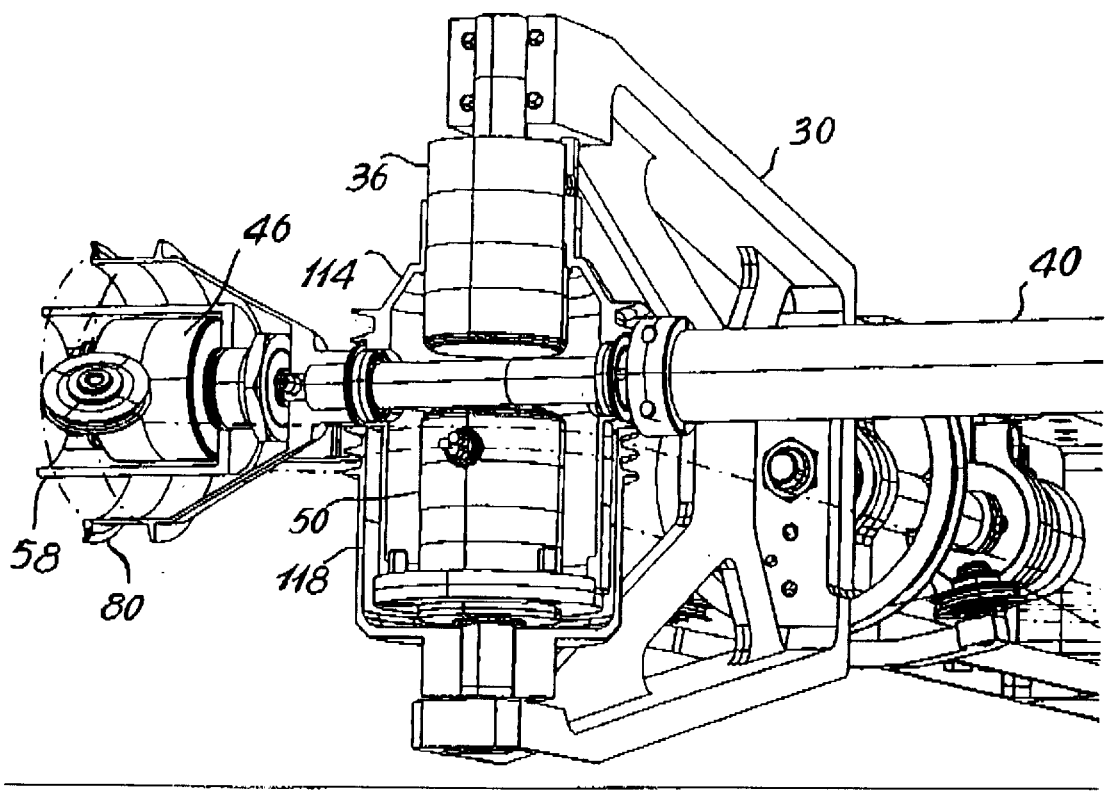

FIG. 8 shows a cutaway view of second stage 14. Sensors 36 and 50 may be seen in place. FIG. 11 and FIG. 12 show an additional cutaway view of third rotational sensor 46. Here, part of third rotational sensor support case 58 may be seen. This case 58 is connected to and supported by third rotational sensor support 48.

Idler pulley 88 is attached to a fourth rotational sensor 50 mounted inside second stage body 38. As illustrated in FIG. 12, a cylindrical connecting structure joins pulley 88 to the shaft of sensor 50. The body of sensor 50 is fixedly attached to second stage body 38. Sensors 46 and 50 both measure the rotation of third stage shaft 42 about axis 56; sensor 46 measures the shaft 42 rotation directly, and sensor 50 measures it indirectly, from the movement of tendon 86. The angular measurement range of each sensor is about 110 degrees. By placing sensors 46 and 50 in quadrature, together they can measure over a 360-degree rotation. When one sensor is out of its range, the other can make a reliable measurement. By monitoring the readings on both sensors, any slippage due to tendon stretching can be accounted for—sensor 46 is taken as the primary sensor, and an adjustment factor is added to the reading from sensor 50 in order to give the same reading as sensor 46 for the same angle. A small overlap in the valid reading ranges of sensors 46 and 50 allow for the correction to be made during handle rotation.

Figure 13:
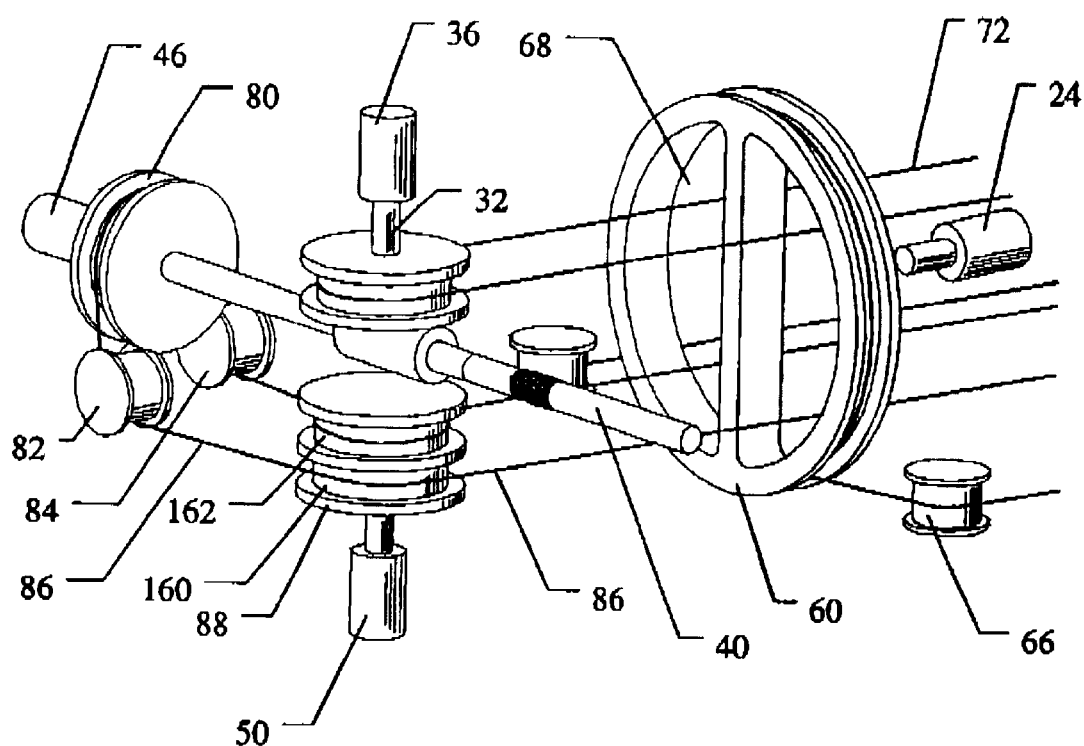
Figure 14:
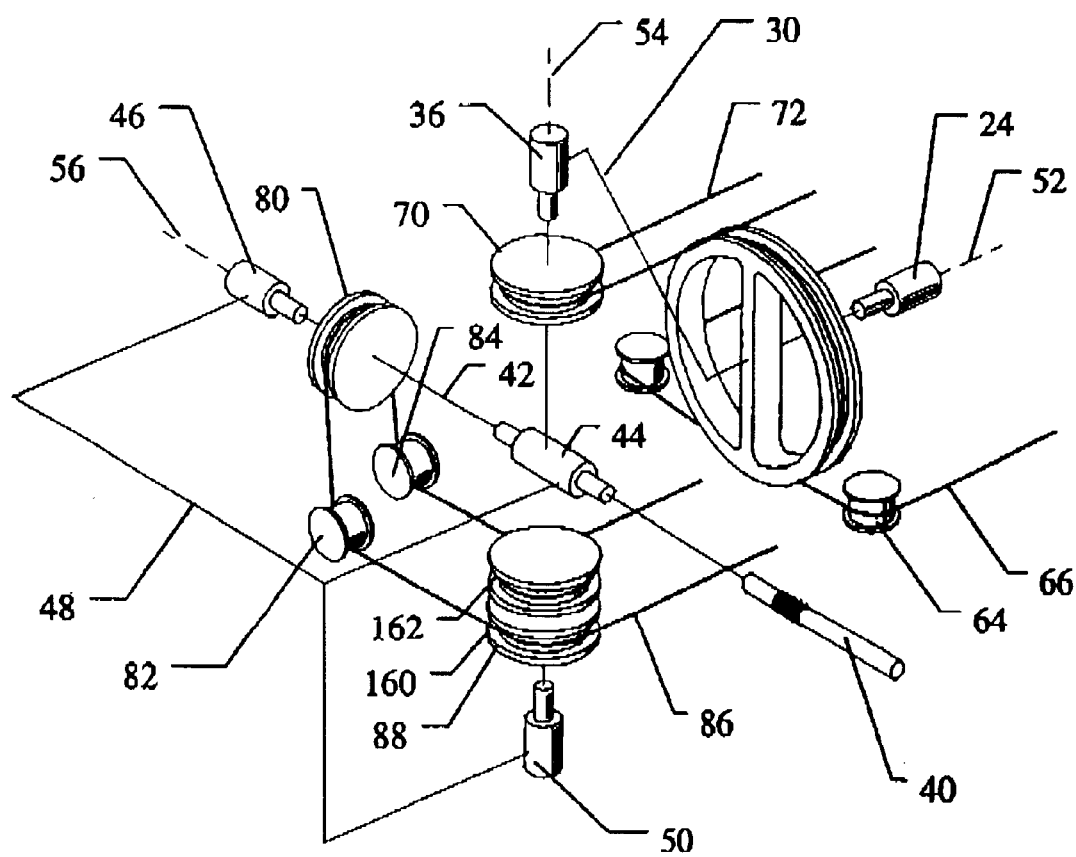

FIG. 13 and FIG. 14 show conceptual diagrams where the foregoing description may also be followed. Here, the pulleys are shown without the enclosing pulley extensions.

Ramifications

The application possibilities for force feedback devices are very extensive. They include medical simulation, assistance in constructing realistic animations in filmmaking, and telerobotics control for manipulations in hazardous environments.

The device can in general be used in any application where lightweight yet robust gimbals are required with incorporated angle sensors. This would include a hand controller with no force feedback, in which the primary requirement is an accurate measurement of the yaw, pitch and roll angles.

It could equally be used in positioner devices, such as antenna mounts or steerable platforms. It is especially appropriate for uses at the end of a boom or articulated mechanism. With its low weight and compact design, it can take advantage of tension-based torque transfer mechanisms, based on both metallic and non-metallic tendons.

Figure 6A:
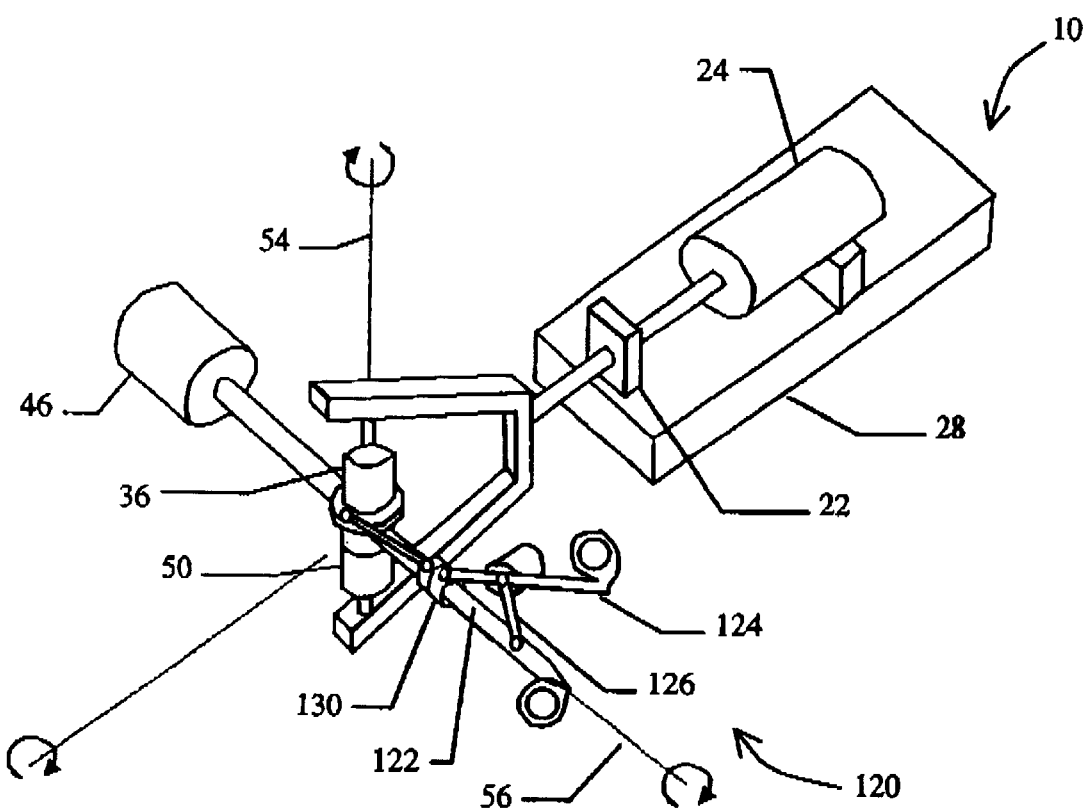
Figure 6B:
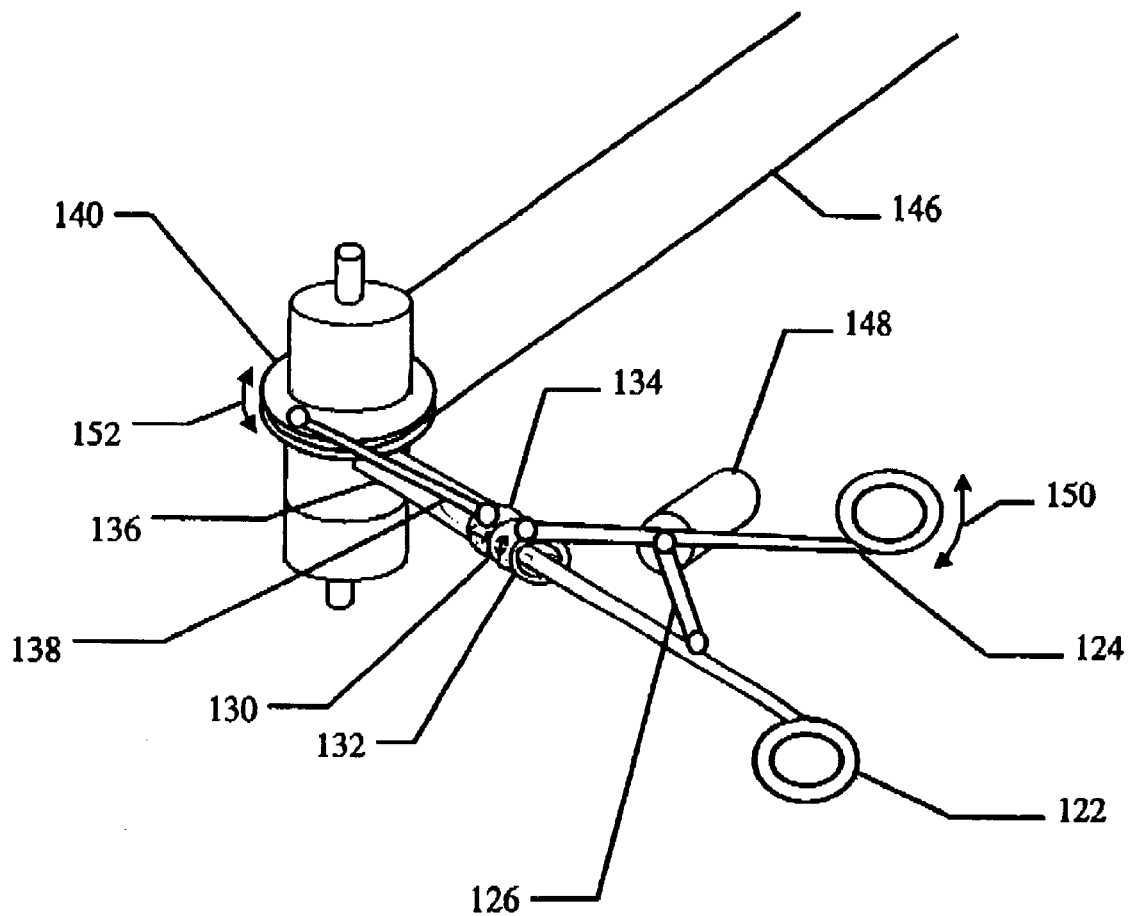
Figure 7:
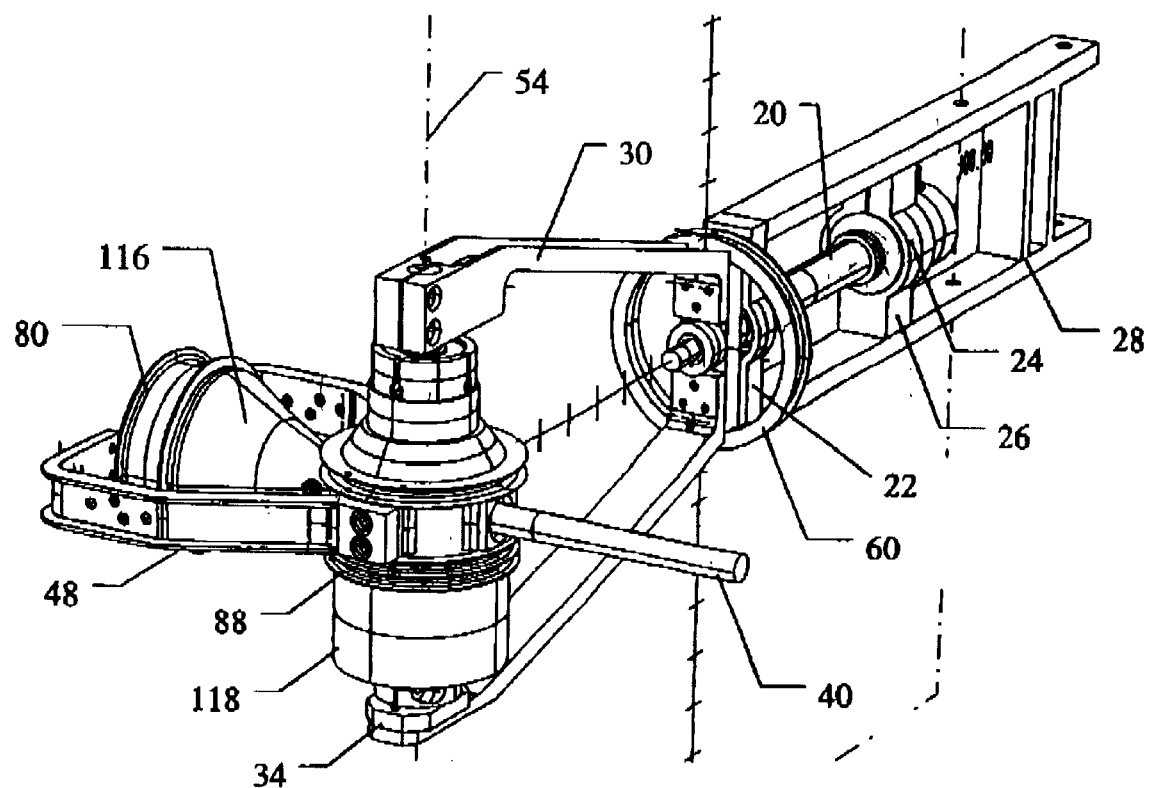

It is possible to add an additional degree of freedom to allow force feedback scissors or gripper. One embodiment of this concept is sketched in FIG. 6A and FIG. 6B. A scissors mechanism 120 is illustrated as a replacement for handle 40. Scissors 120 have a lower handle 122 and an upper handle 124. Lower handle 122 is attached to third stage shaft 42 in the same manner as handle 40; sensors 46 and 50 measure its angle of rotation, as they do for handle 40. Upper handle 124 is attached at its midpoint by means of an idler link 126 to lower handle 122. Upper handle 124 has a first and a second end. Its first end terminates in the finger loop; its second end is attached to a slider/rotator mechanism 130. Slider/rotator mechanism 130 is mounted on an extension sleeve 136 attached to second stage body 38 (in particular, to second stage drive pulley extension 114). Lower handle 122 passes through sleeve 136, so that lower handle 122 can rotate independently of slider/rotator 130. Slider/rotator 130 has two halves—rotator 132 is free to rotate about axis 56, and slider 134 can slide on sleeve 136 parallel to axis 56, but not rotate. The two halves, 132 and 134, are attached in such a way that the motions of both halves are not impeded, but the sliding motion of 134 is imparted to rotator 132. Slider half 134 is attached to a drive link 138, which is coupled to a scissors drive pulley 140; rotator half 132 slides with the slider half 134, and imparts force to the upper handle 124 end while allowing the upper handle 124 to rotate freely about axis 56 passing through the lower handle 122. A fifth sensor 148, mounted on the upper handle at the idler link, measures the opening angle of the scissors. The scissors drive pulley 140 is free to rotate about second stage axis 54, carrying no other load but the scissors mechanism 120; a tendon 146 transmits torque from a remote motor to the scissors drive pulley 140.

Construction

The construction material is aluminum, and all parts are created by machining from solid aluminum. The following detailed changes may be noted from an examination of FIG. 7 to FIG. 12.

Moveable base 28 is an aluminum framework.

Sensor 24 is fixedly attached to the moveable platform 28 by two supports 26, top and bottom. Second stage support 30 is fixedly attached to first stage drive pulley 60; it is formed of two parts to permit assembly.

Second stage drive pulley 70 has holes in its flanges to allow tendon 72 to be fixed to the pulley. Fourth sensor pulley 88 has a middle ridge to separate the right and left halves of tendon 86; it is thereby divided into an upper half 162 and a lower half 160.

Sensor 46 is covered by a conical structure that also carries drive pulley 80. A yoke assembly 48 supports sensor 46; the yoke assembly is attached at two places to second stage body 38 (in particular, to second stage drive pulley extension 114).

Left idler 82 and right idler 84 are mounted on third rotational sensor support 48, at such an angle that tendon 86 is directed from pulley 88 around pulley 80.

Each magneto-resistance sensor (24, 36, 46 and 50) has four wires to provide power for the sensor, and angle readout. These wires are routed from distal mechanism 10 into the moveable platform 28.

The magneto-resistance sensors are from Midori America Corporation, with Model CP-2UPX for first rotational sensor 24, second rotational sensor 36 and fourth rotational sensor 50, and Model CP-2UTX for third sensor 46 and scissors sensor 148. Model CP-2UPX includes sturdier bearings that were incorporated into the design (after removing the wide flange on Model CP-2UPX).

Operation

In operation, the user grasps the handle and moves it. The rotational sensors measure the angle of the handle rotation, and transmit these measurements to a computer, where they are digitized. In a simulation or in a real robot, the position signals are used to move a probe. When this probe, whether real or virtual, comes in touch with another real or virtual object, then a contact force is generated. The calculated force is used to compute the force and torque to be imposed on the user's hand. The calculated torque component is used to drive the distal tendon motors, which exert force on one of the tendon halves wrapped around the capstan of the motor. One side of the tendon loop is tensioned. This imparts torque to one or more of the drive pulleys, causing a felt torque in one or more of the three degrees of freedom, as mediated by one or more of the stages in the distal mechanism.

In first stage 12, a tension on one side of tendon 66 imparts a torque to drive wheel 60. This torque is transmitted to second stage support 30, thence to support shafts 32 and to third stage support 44, thence to handle 40, and finally to the user's hand.

In second stage 14, a tension on one side of tendon 72 imparts a torque to drive wheel 70. This torque is transmitted to drive wheel extension 114, thence to third stage support 44, and then to handle 40, and finally to the user's hand.

In third stage 16, a tension on one side of tendon 86 imparts a torque to drive wheel 80. This torque is transmitted directly to handle 40, which is fixedly attached to drive wheel 80, thence to the user's hand.

Movements of the user's hand are measured by the four sensors. If the user makes handle 40 roll about axis 56, then this movement is measured in sensors 46 and 50. If the user makes second stage 14 yaw about axis 54, then this movement is measured in sensor 36. If the user makes first stage 12 pitch about axis 52, then this movement is measured in sensor 24.

NOVEL FEATURES

By having the sensors mounted directly on the distal stage as opposed to near the motors, accuracy of angle measurement is maximized, for lower dynamical instability, reduced mechanical backlash and greater robustness of calibration. The magneto-resistance sensors are also better shielded from the magnetic field of the driving motors.

With its small weight, the device is highly responsive to the driving torque applied by the motors, thus making possible the rendering of higher virtual stiffness.

By making use of magneto-resistance effect sensors connected to a 16 bit analog to digital converter, the device can deliver an angular resolution of some 25 seconds of arc, without the weight, size and expense penalties incurred by optical encoders.

The serial nature of the design provides a simpler coupling of the 3 degrees of freedom into roll-pitch-yaw, and greatly simplifies the forward kinematics and static force analysis.

The device incorporates two sensors phase-shifted to measure the handle rotation, thereby providing a workspace around that axis limited only by the tendon routing.

In both the pitch and the roll motions, out of plane bending of the tendon is minimal so that torsion forces do not need compensation when computing force feedback. The design also makes no use of gears, with their attendant friction and backlash problems.

What is claimed is:

1. A hand controller apparatus for interfacing a human operator with a slave machine, comprising:
    a mounting base;
    a first-stage portion secured to said base, said first-stage portion having a first structure supporting a first shaft, said first shaft being journaled to said first structure so as to rotate about a longitudinal axis of said first shaft;
    a second-stage portion having a second structure secured to said first shaft so as to rotate with said first shaft, said second structure supporting a second shaft journaled thereto, such that said second shaft rotates about a longitudinal axis of said second shaft;
    a third-stage portion having a third structure secured to said second shaft so as to rotate with said second shaft, said third structure supporting a third shaft journaled thereto, such that said third shaft rotates about a longitudinal axis of said third shaft, said third shaft having a handle portion coaxially projecting therefrom and adapted for being handled by a human operator, said handle portion being displaceable in three rotational degrees of freedom with respect to said base;
    wherein connections between each said shaft with a respective one of said structures includes at least a sensor for sensing and measuring rotation of each said shaft with respect to said respective one of said structures, and wherein at least one of said shafts is connected to a respective one of said structures by two sensors for sensing and measuring rotation between said shaft and said respective one of said structures, a rotational displacement sensing range of a first one of said sensors being juxtaposed to a rotational displacement sensing range of a second one of said sensors, such that rotation between said at least one shaft and said respective one of said structures is sensed and measured over a combination of said rotational displacement sensing ranges of said first one and second one of said sensors.

2. The hand controller apparatus according to claim 1, wherein each said shaft is connected to a respective actuation device by at least a tendon for receiving force feedback from said respective actuation device, whereby said hand controller apparatus is adapted for transmitting force feedback to a human operator.

3. The hand controller apparatus according to claim 2, wherein each said shaft has at least a pulley portion for engaging with said tendons.

4. The hand controller apparatus according to claim 3, wherein said tendons are polymer tendons.

5. The hand controller apparatus according to claim 3, wherein said actuation devices are rotational motors.

6. The hand controller apparatus according to claim 5, wherein said tendons connecting a capstan of said rotational motors to said pulley portions are tensioned by tensioning devices.

7. The hand controller apparatus according to claim 6, wherein each said tensioning device consists of a pulley receiving one of said tendons and mounted to a hinged arm, whereby pivoting of said arm adjusts tension of said tendon.

8. The hand controller apparatus according to claim 1, wherein said base is adapted for being connected to a mechanism displaceable in three translational degrees of freedom, whereby said handle portion is displaceable in 6 degrees of freedom.

9. The hand controller apparatus according to claim 1, wherein each said sensor comprises at least a bearing for being rotatively connected to a respective one of said shaft.

10. The hand controller apparatus according to claim 9, wherein said sensors are high-resolution magneto-resistance sensors.

11. The hand controller apparatus according to claim 1, wherein said handle portion has a coaxial portion and a scissors portion, said scissors portion having a first end connected to said handle portion so as to translate thereon, said scissors portion being pivotable about said first end so as to be translated, whereby a fourth degree of freedom is provided on said third-stage portion with respect to said base.

12. The hand controller apparatus according to claim 11, wherein a sensor is provided adjacent to said first end of said scissors portion, so as to sense pivoting of said scissors portion with respect to said handle portion.

13. The hand controller apparatus according to claim 12, wherein said scissors portion is connected to a tendon for receiving force feedback therefrom.

14. The hand controller according to claim 11, wherein a second end of said handle portion and an adjacent end of said handle portion each have a finger loop adapted for receiving fingers of a human operator.

15. The hand controller apparatus according to claim 1, wherein said handle portion has a pen-like configuration for allowing writing-like manipulations by a human operator.

16. The hand controller apparatus according to claim 1, wherein said longitudinal axes of said first shaft, said second shaft and said third shaft intersect.

* * * * *